Figure 1:
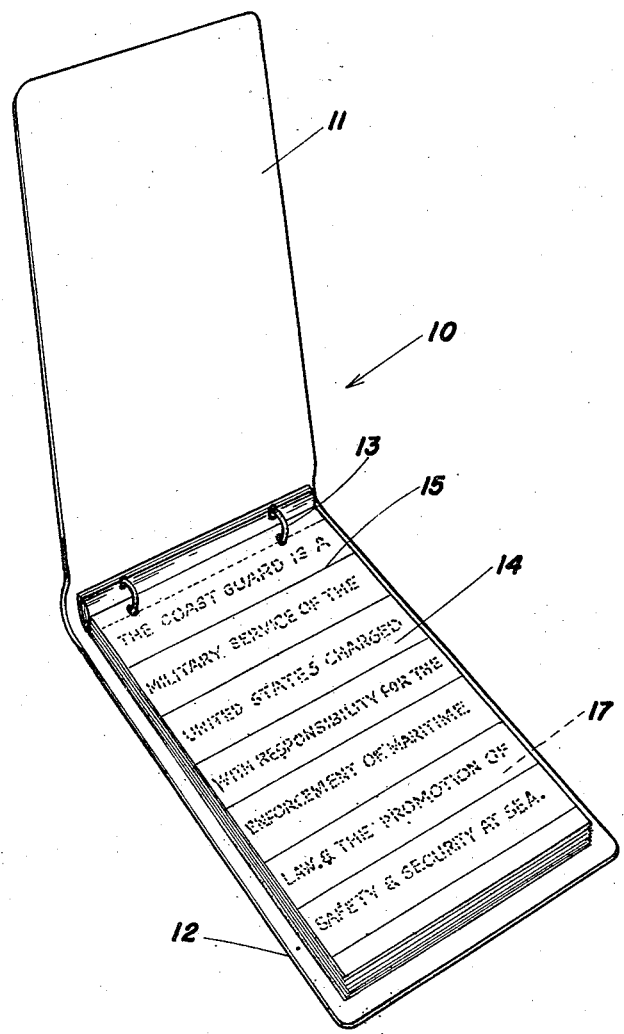

Dec. 7, 1948.  S. T. BELL  2,455,353
COPY AND PRACTICE BOOK

Filed May 8, 1944  3 Sheets—Sheet 1

INVENTOR.
STANLEY T. BELL
BY *W. Glenn Jones*
ATTORNEY

Dec. 7, 1948. S. T. BELL 2,455,353
COPY AND PRACTICE BOOK
Filed May 8, 1944 3 Sheets-Sheet 2
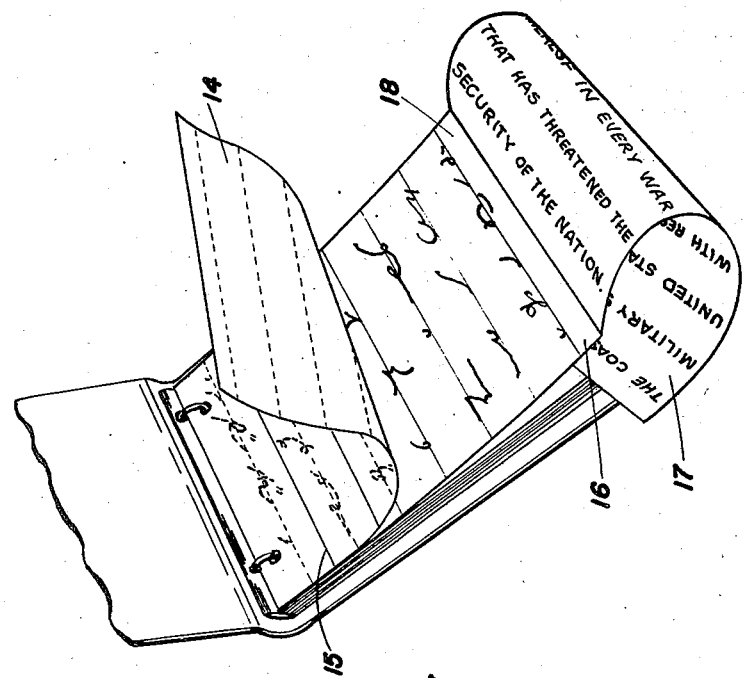
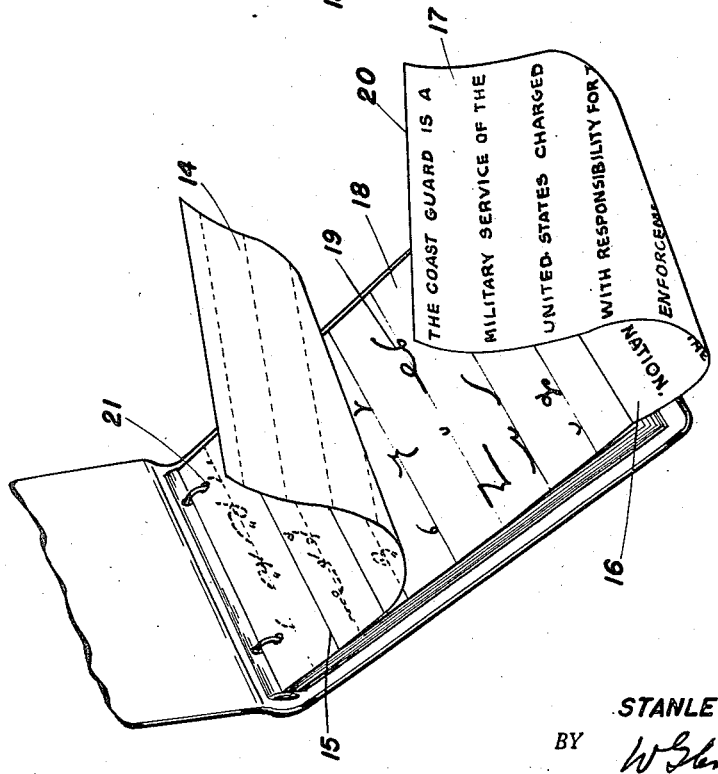
INVENTOR.
STANLEY T. BELL
BY W Glenn Jones
ATTORNEY Dec. 7, 1948.  S. T. BELL  2,455,353
COPY AND PRACTICE BOOK Filed May 8, 1944  3 Sheets-Sheet 3

INVENTOR.
STANLEY T. BELL
BY
*W Glenn Jones*
ATTORNEY

Patented Dec. 7, 1948

2,455,353

UNITED STATES PATENT OFFICE 2,455,353

COPY AND PRACTICE BOOK

Stanley T. Bell, Washington, D. C.

Application May 8, 1944, Serial No. 534,657

17 Claims. (Cl. 283—45)

(Granted under the act of March 3, 1883, as amended April 30, 1928; 370 O. G. 757)

This invention relates to a text and practice book designed primarily for self-instruction in either shorthand or language, and more particularly to a practice book wherein a semitransparent scratch sheet for receiving the student's writing selectively overlies the printed copy material or the printed equivalent shorthand or foreign language.

Practice books heretofore used for the same purpose have been bulky and required the removal from the book and the reinsertion therein of at least one of the several sheets involved when a comparison of the student's work with the printed key was desired. This interleaving by the student tends to misplace the printed sheets, materially reducing the value of the book, and the student encounters difficulty in lining up, and keeping lined up, his written matter with the printed copy or key.

The present invention contemplates a practice book wherein either the printed matter to be copied, or the key, that is the equivalent printed shorthand or foreign language with which the student compares his handwritten material, may be placed directly under the scratch sheet in perfect alignment and without removing any sheets from the binding of the book. It also provides for the use of both sides of the sheets bearing the printed matter.

It is the object of this invention to provide a shorthand or language text and practice book wherein it is not necessary to remove any sheets from the binding means to either translate from the printed sheets or compare the written matter with the printed key.

It is a further object of this invention to provide a shorthand language practice book wherein the printed copy and the printed shorthand or language equivalent may be alternatively properly placed with respect to an overlying semitransparent scratch sheet without removing any sheets from the binding of the book.

It is a further object of this invention to construct a self-instructing shorthand or language practice book utilizing both sides of the sheets carrying the printed matter.

It is a further object of this invention to materially reduce the bulk of self-instructing shorthand or language practice books without any reduction in the volume of practice matter therein.

It is a further object of this invention to provide a self-instructing shorthand or language practice book that when it is finished by leafing through in one direction it is ready for reuse by turning it over and leafing through in the other direction.

Each practice book consists of a plurality of sets of sheets of paper, each set composed of one semitransparent scratch sheet for receiving the student's written work, one opaque sheet of printed text or copy and an opaque sheet with the key or equivalent shorthand or language printed thereon. One of the opaque sheets is bound in the book while the other is attached to the free end thereof and folds into the book, either over or under the bound sheet. As each side of the opaque sheets carry printed matter, a second semitransparent scratch sheet is provided as the bottom sheet in each set, permitting reversal of the book to provide additional copy.

While the practice book constituting the instant invention is adapted for general instruction it is particularly designed for correspondence school work, as, for example, instruction in shorthand to Navy personnel on sea duty. The course would consist of a series of practice books which would be sent to the student who, upon completion thereof, would return the book as evidence of his work. By replacing the semitransparent scratch sheets, the books would be ready for further service.

Figure 5:
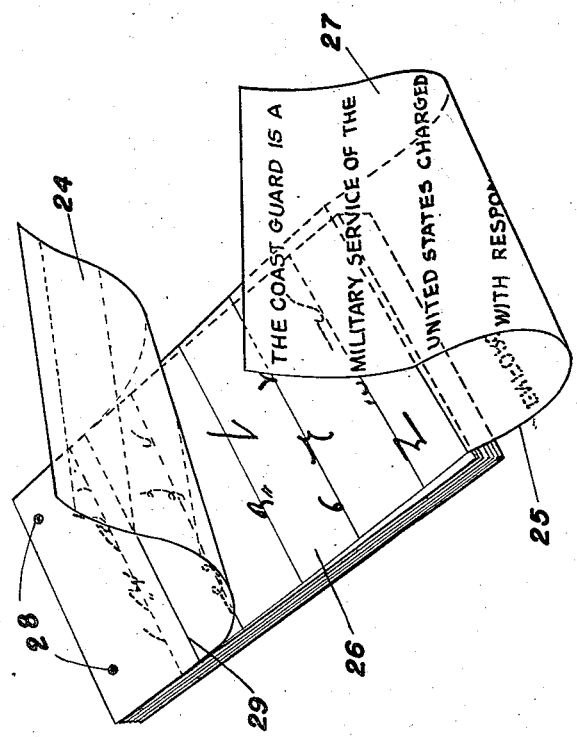
Figure 4:
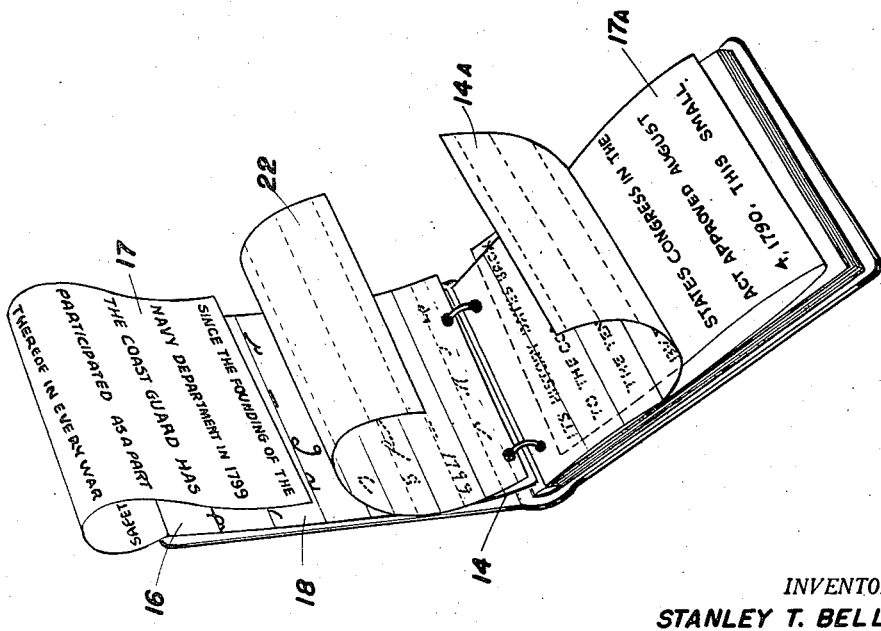

In the drawings, Fig. 1 is a perspective view of a shorthand practice book with the cover open and ready to receive the student's written shorthand symbols of the printed copy showing through the semitransparent scratch sheet; Fig. 2 is a similar view with the semitransparent scratch sheet partly turned back and the printed copy sheet partly removed to show the printed shorthand equivalent on the following sheet; Fig. 3 is a similar view showing the printed copy sheet in the process of being folded under the printed shorthand sheet; Fig. 4 is a perspective view of a practice book with the first set of sheets turned up against the cover, exposing the second set of sheets, and disclosing the printed matter on the reverse side of the first set of sheets as well as the semitransparent scratch sheet for use in connection therewith; Fig. 5 is a perspective view of a modified form of the invention.

While the drawings disclose the invention as applied to a shorthand text and practice book, a language text and practice book would be arranged in the same manner, with the foreign language substituted for the shorthand.

The embodiment of the invention as disclosed in the accompanying drawings comprises a looseleaf notebook 10, having a front cover 11, a rear cover 12 and rings 13 for holding the sets of sheets therein. Each set of sheets comprises a semitransparent scratch sheet 14, having lines 15 ruled on one side thereof, and adapted to receive the student's hand written shorthand characters and an opaque sheet 16. This opaque sheet 16 is approximately twice the size of the semitransparent sheet 14, and one edge thereof is bound in the book. As shown in the drawing this consists merely in rings 13 passing through perforations 21 in the edge of the sheet, though other means of binding may be used. Sheet 16 carries both the printed text, or copy, to be copied by the student in shorthand and the printed key or shorthand equivalent. The upper half 18 carries the printed shorthand characters 19 on the obverse side while the lower half 17 carries the printed copy on the reverse side thereof in a position such that when the lower half is folded back upon the upper half the printed copy is in normal position. When the sheet 16 is folded the free end 20 of the lower half 17 falls just short of the perforations 21 at the bound end of the upper half 18, as shown in Fig. 1, permitting the ready removal of the folded portion 17 from the book. When in this position the printed copy is uppermost and may be read through the overlying scratch sheet 14 upon which the student writes. The ruled lines 15 of the semitransparent scratch sheet 14 are widely spaced and are not in alignment with the lines of printed matter on either half of sheet 16, so that lines 15 lie intermediate thereof when superimposed thereon. The lines of printed copy and printed shorthand have the same relative position, so that they are superimposed when the lower half 17 is folded over the upper half 18 and, consequently, have the same relative position with respect to the ruled lines 15 of sheet 14. The sheet 16 may be one piece, or it may be composed of two pieces joined along one edge and in either case may be reinforced along the fold with tape or the like.

Thus, in using the practice book, the printed text matter is visible through the semitransparent sheet 14 and the student writes the shorthand equivalent on lines 15 which are intermediate the lines of printed matter showing through the sheet 14. When it is desired to compare the written copy with the printed shorthand characters on the upper half 18 of sheet 16, the lower half 17 is pulled out, as shown in Fig. 2 and then folded under the upper half 18 as shown in Fig. 3 until it lies flat thereunder. The printed shorthand characters 19 then appear in the same position the printed copy formerly appeared and the student may then compare his written work with the printed shorthand characters. The student may then turn to the next set of sheets and so progress through the book.

Actually sheet 16 is printed on both sides. The obverse of the lower half 17, as viewed in Fig. 3, carries printed copy while the reverse of the upper half 18 carries the equivalent printed shorthand characters. Fig. 4 discloses the relative position and arrangement of the printed matter on each sheet of the practice book. The first set of sheets has been turned up against the cover 11, showing the next set of sheets with the printed copy sheet 17A folded under the partially turned up semitransparent sheet 14A and slightly askew, for purposes of illustration only, ready for the student to commence copying the copy in shorthand. The other sides of the two halves 17 and 18 of sheet 16 are disclosed, the lower half 17 is partially withdrawn to show the equivalent printed shorthand characters on the reverse side of upper half 18. A semitransparent scratch sheet 22 is inserted under the sheets 14 and 16 with the ruled side thereof facing downward as viewed in Fig. 4 so that the book may be turned over and this sheet 22 used to receive the student's written shorthand of the copy appearing on the reverse side of the upper half 18 of sheet 16.

It will be seen that when the student leafs through the book in one direction, turning the lower half 17 of each of sheets 16 under to compare his work with the printed shorthand characters therebeneath, the book may be turned over and then leafed through in the other direction to copy the material appearing on the other sides of the sheets previously copied. Upon completion of the book, the semitransparent sheets may be removed and new ones inserted, or, several such sheets could be originally placed in the book in lieu of each of those shown, in which case the sheet adjacent the printed matter would be used. These used sheets could then be removed and the next semitransparent sheet used.

While a loose-leaf practice book is disclosed, a permanently bound book may be used, in which case additional semitransparent sheets may be bound in with each of those shown to permit the book to be used more than once.

A modification of the invention is disclosed in Fig. 5 wherein each set of sheets comprises a semitransparent scratch sheet 24 and a semitransparent sheet 25 containing the printed copy and its printed key. The sheet 25 is approximately twice the size of the scratch sheet 24 and has one edge thereof fastened in the book by staples 28. The lower half 27 of this sheet is provided with printed copy on the reverse side thereof and so positioned that when folded back over the upper half 26 it is exposed in normal reading position and the free end thereof falls just short of the staples 28 permitting ready removal of this lower half from the book. The obverse side of the upper half 26 is provided with the printed key, shown as shorthand characters in Fig. 5. The lines of printed copy on lower half 27 are disaligned with the lines of the printed key on the upper half 26 so that when the lower half is superimposed on the upper half, the printed copy does not obscure the printed key showing therethrough but appears adjacent thereto and permits the student to readily compare the same. The semitransparent sheet 24 has lines 29 ruled thereon which are not in alignment with either the lines of printed matter on the lower half 27 or the lines of printed key on the upper half 26. By this spacing, the student's written characters on the scratch sheet 24 do not obscure either the printed copy or printed key when viewed through sheet 24. While the semitransparency of sheet 25 prohibits the use of both sides thereof for printed material, this modification has the added advantage over the previously described practice book in that the student may compare the printed key with the printed copy when the lower half 27 is superimposed over the upper half 23. When it is desired to compare the student's written work with the printed key, the upper half 27 of sheet 25 is withdrawn and may be folded back out of the way under the upper half 26.

While I have described the preferred form of my invention I do not wish to limit myself to the prescribed details as shown but wish to avail myself of such variations and modifications as may come within the scope of the appended claims.

The invention described herein may be manufactured and used by or for the Government of the United States of America for governmental purposes without the payment of any royalties thereon or therefor.

I claim:

1. A combination text and practice book comprising a plurality of sets of sheets, each set comprising a semitransparent sheet for receiving written characters and a printed sheet, said printed sheet being approximately twice the length of said semitransparent sheet, the lower half of said printed sheet adapted to be folded against the upper half thereof, said printed sheet having copy printed on one side of one half thereof and a key printed on the other side of the other half, whereby either the printed copy or key may immediately underlie the said semitransparent sheet, and spaced lines to serve as guide lines for said written characters, the printed copy and printed key being correspondingly spaced a fraction of a space out of alignment with said spaced lines when in underlying relation to said semitransparent sheet.

2. A combination text and practice book comprising a plurality of sets of sheets, each set having one sheet of double length, the free end of said sheet folded back upon itself, printed copy on the reverse side of that portion of said sheet which is folded back and the printed equivalent key on the observe side of that portion of said sheet underlying said folded back portion, and a semitransparent sheet overlying said printed sheet and adapted to receive written characters, said printed copy and printed key having the same relative position and being superimposed when the sheet of double length is folded upon itself, the lines of said printed copy and the lines of said printed key being spaced apart a substantial distance and sufficient that written characters on the semitransparent sheet will not obscure the printed matter on said sheet of double length.

3. A combination shorthand text and practice book comprising a plurality of sets of sheets, one sheet of each set being of double length with the free end folded back upon itself, the reverse side of the folded portion of the sheet bearing printed copy and the underlying portion bearing the printed shorthand equivalent on the obverse thereof, said printed copy and key being correspondingly spaced, and a semitransparent scratch sheet overlying the folded printed sheet whereby the said folded portion may be removed to permit the underlying portion to be viewed through the said semitransparent sheet to permit comparison of characters written on said semitransparent sheet with said key, the space between lines of said printed copy and key being substantial and sufficient that said written characters will not obscure the printed matter.

4. A combination text and practice book comprising a plurality of sets of sheets, one sheet of each set comprising a folded sheet, the reverse of the folded portion carrying printed copy, the obverse of the remainder carrying a printed key, said printed copy and key being correspondingly spaced, and a semitransparent sheet overlying said folded sheet adapted to receive written work whereby either portion of the folded sheet may be viewed through the semitransparent sheet for copying the printed copy or comparing the written work with the printed key, the space between lines of said printed copy and key being substantial and sufficient that the written work will not obscure the printed matter.

5. In a combination text and practice book, a set of sheets comprising a first semitransparent scratch sheet and a second sheet, said second sheet being approximately twice the length of said first sheet and having a key printed on the obverse side of the upper half and copy printed on the reverse side of the lower half, the lower half of said second sheet being folded under or over the upper half whereby either the key or copy may be made to immediately underlie the said first sheet, the printed copy and key being equally spaced apart a sufficient distance that characters written on said scratch sheet adjacent the underlying printed copy are similarly positioned with respect to said key and do not obscure said key.

6. A shorthand text and practice book comprising a plurality of sets of sheets, each set comprising a semitransparent scratch sheet, an opaque sheet underlying said semitransparent sheet and visible therethrough, said opaque sheet being double the length of the said scratch sheet with its free end folded back upon itself, said free end having printed copy on the reverse thereof thereon and the remainder of said sheet having the shorthand equivalent printed on the obverse thereof, the corresponding lines of printed copy and shorthand equivalent being spaced a substantial distance apart whereby shorthand handwritten on said scratch sheet adjacent said copy will not obscure said printed shorthand when said scratch sheet overlies said printed shorthand.

7. In a combination text and practice book, a set of sheets, each set comprising a semitransparent sheet for inscribing characters thereon, and a sheet having printed matter thereon underlying said semitransparent sheet and readable therethrough, said printed sheet being longer than said semitransparent sheet and folded to permit the half of said sheet adjacent the free end thereof to be folded in or out of the said book, one half of said printed sheet being provided with printed copy and the other side of the other half being provided with the equivalent printed key, whereby the half of said printed sheet adjacent the free end thereof may be placed under said semitransparent sheet while the shorthand equivalent is written on said semitransparent sheet, or removed to expose the printed shorthand on the other half of said printed sheet for the purpose of comparing the written and printed shorthand, the lines of said printed copy overlying the corresponding lines of said key when said printed sheet is folded and being spaced apart a substantial distance.

8. A shorthand text and practice book comprising a plurality of sets of sheets, each set including a semitransparent sheet and a printed sheet, said printed sheet being double the length of the said semitransparent sheet, the reverse of the half of said sheet adjacent the free end thereof bearing printed copy and adapted to be folded over the other half of said sheet which bears the equivalent printed shorthand characters on the obverse side, the lines of printed matter on the two halves being correspondingly spaced, whereby the half of said sheet adjacent the free end may be placed under the semitransparent sheet or removed to expose the printed matter on the half of said sheet therebeneath, and spaced lines indicating the proper position on said semitransparent sheet with respect to said printed sheet for characters on said semitransparent sheet, the lines of printed matter being out of alignment with said spaced lines.

9. In a combination text and practice book, a set of sheets comprising a pair of semitransparent sheets and an opaque sheet of approximately twice the length of said semitransparent sheets and positioned therebetween, said opaque sheet having printed copy on both sides of one half thereof and a printed key on both sides of the other half, said printed copy and its equivalent key being on opposite sides of said opaque sheet and correspondingly spaced, whereby the semitransparent sheets may overlie either the printed copy or the equivalent printed key.

10. In a combination text and practice book, a set of sheets as claimed in claim 9, said semitransparent sheets having lines ruled thereon, said lines being disaligned with the lines of printed copy and printed key.

11. A combination text and practice book comprising a plurality of sets of sheets, each set comprising a first semitransparent scratch sheet, an opaque sheet underlying said first semitransparent sheet and visible therethrough, said opaque sheet being approximately twice the length of said first sheet and having copy printed on the reverse side of the lower half and a corresponding key printed on the obverse side of the upper half the lower half of said opaque sheet adapted to be folded under or over the upper half, said opaque sheet also having additional copy printed on the obverse side of the lower half and an additional corresponding key printed on the reverse side of the upper half, and a second semitransparent scratch sheet underneath said opaque sheet whereby the first semitransparent sheet may overlie either the printed copy or its key or the said set may be turned over to permit the second semitransparent sheet to overlie either the additional printed copy or its equivalent key.

12. A combination text and practice book as claimed in claim 11, the lines of printed copy and printed key being correspondingly spaced.

13. A combination text and practice book as claimed in claim 11, the lines of printed copy and printed key being correspondingly spaced and said semitransparent sheets having lines ruled thereon, said lines and the lines of printing being disaligned whereby matter inscribed on the said semitransparent sheets does not obscure the printed matter viewed therethrough.

14. A combination text and practice book comprising a plurality of sets of sheets, each set comprising a first semitransparent scratch sheet, and a second semitransparent sheet underlying said first sheet, said second sheet being longer than said first sheet, printed copy on the reverse side of the lower half of said second sheet and a printed key on the obverse side of the upper half of said second sheet, the lower half of said sheet adapted to be folded over or under the upper half thereof.

15. A combination text and practice book comprising a plurality of sets of semitransparent sheets, each set comprising a scratch sheet provided with lines and adapted to receive written characters thereon, and a printed sheet underlying said scratch sheet, said printed sheet being approximately twice the length of said scratch sheet and adapted to be folded thereunder, printed copy on the reverse side of the lower half of said printed sheet and a printed key on the obverse side of the upper half of said printed sheet.

16. A combination text and practice book as claimed in claim 15, said lines on said scratch sheet and the lines of printed matter on said printed sheet all being spaced a fraction of a space out of alignment with each other enabling the said scratch sheet to be superimposed over said printed copy or over said key without the matter written thereon obscuring the said copy or key and enabling the said printed copy to be superimposed over the said printed key for enabling the student to compare the same.

17. A combination text and practice book as claimed in claim 15, the said lines on said scratch sheet, the lines of the printed copy and the lines of the printed key on said printed sheet all being out of alignment whereby the superimposition of any one over another will not obscure the other.

STANLEY T. BELL.

REFERENCES CITED

The following references are of record in the file of this patent:

UNITED STATES PATENTS

| Number | Name | Date |
|---|---|---|
| 171,268 | Crall | Dec. 21, 1875 |
| 399,060 | Loewenbach | Mar. 5, 1889 |
| 544,714 | Yorke | Aug. 20, 1895 |
| 791,706 | Levison | June 6, 1905 |
| 1,039,166 | Mefort | Sept. 24, 1912 |
| 1,450,261 | Robinson | Apr. 3, 1923 |

FOREIGN PATENTS

| Number | Country | Date |
|---|---|---|
| 5,448 | Great Britain | 1899 |